May 5, 1970
J. R. GREER
3,509,767
MANOMETRIC APPARATUS
Filed July 1, 1968
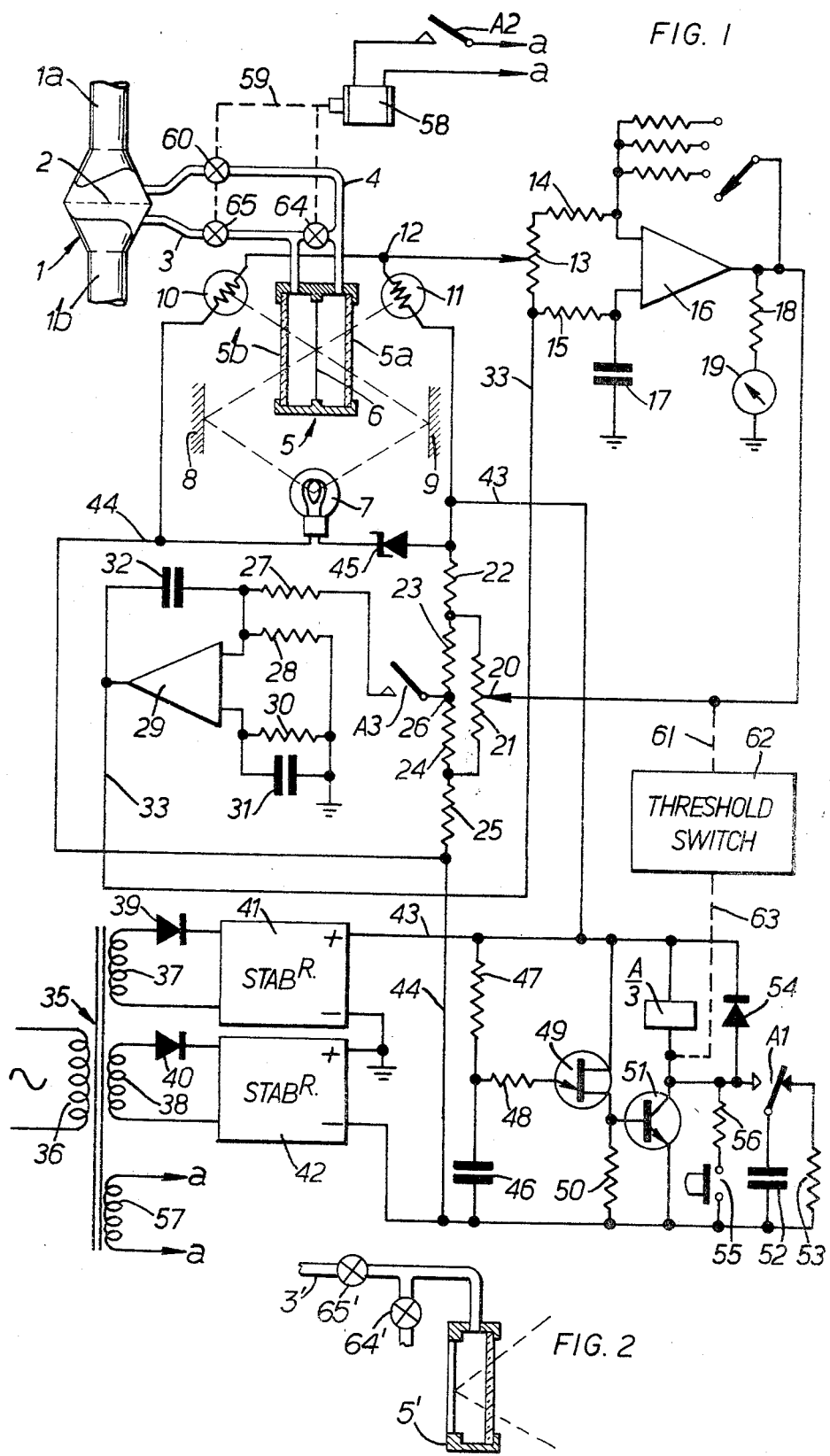

United States Patent Office 3,509,767
Patented May 5, 1970

3,509,767
MANOMETRIC APPARATUS
James Robertson Bouvard Greer, Glasgow, Scotland, assignor to Mercury Electronics (Scotland) Limited
Filed July 1, 1968, Ser. No. 741,444
Claims priority, application Great Britain, July 4, 1967, 30,756/67
Int. Cl. G01l 13/02
U.S. Cl. 73—398                                    11 Claims

ABSTRACT OF THE DISCLOSURE

Pressure measuring apparatus having a transducer which develops an electric signal in response to the fluid pressure. This signal is applied to a measuring circuit which develops an output signal representative of the measured pressure and which includes a switch error-reducing feedback circuit. A valve establishes a datum condition in the transducer simultaneously with the closing of the feedback path to minimise zero error in the apparatus.

INTRODUCTION

The invention relates to pressure-measuring apparatus in which a transducer means, to which is applied through conduit means a pressure or pressure-difference to be measured, yields an electrical signal which is related to the applied pressure or pressure difference and is applied to a measuring circuit yielding an output signal representative of the measured pressure or pressure difference which is used to control a display, recording or control means.

A difficulty which arises in the use of such apparatus is that of zero drift. Although the apparatus is initially adjusted to provide a particular value of output signal when the measured pressure has a reference value, this condition is not maintained. Although the drift may be corrected by the repeated application of a predetermined test condition and the corresponding readjustment of the electrical circuits to remove any detected error, this operation is inconvenient and may be inadvertently omitted, so that the measurement becomes incorrect.

It is an object of the present invention to provide improved fluid pressure measuring apparatus in which the reduction of zero drift is facilitated.

It is a more specific object of the invention to provide improved fluid pressure measuring apparatus in which zero drift reduction may be effected either manually or automatically.

It is a further object of the invention to provide improved fluid pressure measuring apparatus in which the reduction of zero error may be effected in response to the attainment of a predetermined measured pressure.

It is another object of the invention to provide improved fluid pressure measuring apparatus in which a transducer means is periodically freed from a measured pressure or pressure difference and simultaneously there is established in an associated measuring circuit an error-reducing feedback path.

An embodiment of improved fluid-pressure measuring apparatus utilizing the invention may comprise transducer means responsive to fluid pressure applied thereto by conduit means to develop an electrical signal related to the applied fluid pressure. Valve means may be included in said conduit means which upon actuation establishes a datum condition in said transducer means. A measuring circuit to which the signal from the transducer means is applied includes a switched, feedback path, operable upon closure of the switch to reduce zero error within the measuring circuit. Actuator means are provided which produce simultaneously actuation of said valve means and closure of said switch means thereby to minimise zero error.

Features and advantages of the invention will become apparent from the following description, taken in conjunction with the drawing, which illustrates by way of example an embodiment of pressure measuring apparatus.

FIG. 1 is a circuit diagram illustrating the invention applied to a micromanometric apparatus for measuring animal respiration, and FIG. 2 is a detailed view illustrating an alternative form of the transducer used in such apparatus.

A spirometric head 1 is connected by way of conduits 1a, 1b, in the respiratory path of an animal. The head 1 includes a gauze member 2 disposed across the path of the respired air. The air pressures on each side of gauze 2 are conducted by way of respective conduits 3, 4 to opposite ends of a measuring chamber 5 having glass ends 5a, 5b. Chamber 5 is medianly divided by a resilient and optically reflecting membrane 6, the opposite sides of which are illuminated by light from a lamp 7 which is directed upon the membrane from mirrors 8, 9 through the glass chamber ends 5a, 5b. Light from each of the two sides of the membrane illuminates a respective one of two photo-sensitive resistance elements 10, 11 which are connected in series across a direct voltage supply described below. As membrane 6 is deflected by the pressure difference applied to it from spirometric head 1 the illumination of photo-sensitive resistors 10, 11 will vary differentially, so that the potential at their junction 12 will vary in accordance with the pressure difference between the two sides of the gauze 2.

The potential appearing at point 12 is applied to the slider of a potentiometer 13 connected by way of respective resistors 14, 15 to the two inputs of an operational amplifier 16. One input of amplifier 16 is earthed by way of a capacitor 17 of which the purpose is discussed later. The output of amplifier 16 is applied by way of a resistor 18 to an indicating meter 19 which indicates the measured pressure difference.

The output voltage of amplifier 16 is applied also to the slider 20 of a potentiometer 21, the ends of which are connected to tappings on a symmetrical voltage-dividing network composed of four resistors 22, 23, 24 and 25 which are connected in series across the direct voltage supply. The junction point 26 of the voltage divider is connected to a relay make contact A3. When contact A3 closes it connects the voltage appearing at point 26 to a voltage divider formed by series connected resistors 27, 28, of which the latter is returned to ground. The junction of resistors 27 and 28 is connected to one input of a differential operational amplifier 29, the other input of which is returned to ground by way of the parallel combination of a resistor 30 and a capacitor 31. A feedback capacitor 32 connected from the output of amplifier 29 to its signal input produces integration of the applied signal. The output of amplifier 29 is also connected by way of a lead 33 to the junction of potentiometer 13 and resistor 15 in the input circuit of measuring amplifier 16.

When relay contact A3 is closed any discrepancy between the output voltage of measuring amplifier 16 and the median potential of the direct-voltage supply will produce at the output of feedback amplifier 29 a signal which, when applied to the input circuit of amplifier 16, will reduce the detected discrepancy. Capacitor 32 serves to maintain the applied correction during intervals in which relay contact A3 is open. Capacitors 17 and 31 prevent oscillation and minimise switching artifacts.

The direct-voltage supply is obtained from an alternating current supply by the means now to be described. A transformer 35, of which the primary winding 36 is connected to the A.C. mains, has like secondary windings 37, 38 which by way of half-wave rectifiers 39, 40 supply voltage stabilizers 41, 42 yielding equal direct voltages. The negative pole of stabilizer 41 and the positive pole of stabilizer 42 are grounded while their respective positive and negative poles are connected by way of leads to supply photo-resistors 10, 11, lamp 7, resistor chains 22–25 and operational amplifiers 16 and 29. Lamp 7 is connected across the supply in series with a Zener diode 45.

The direct voltage supply from stabilizers 41, 42 is also used to power a control circuit by which cyclic operation of the system is obtained. A capacitor 46 is charged by way of a resistor 47 and is connected by way of a further resistor 48 to the emitter electrode of a unijunction transistor 49 of which one base is connected to one pole of the supply and the other base is connected by way of a resistor 50 to the other pole of the supply. The action of this circuit is to produce a periodic slow charge and rapid discharge of capacitor 46. Discharge of the capacitor produces across resistor 50 a voltage pulse which is applied to the base of a switching transistor 51 of which the collector-emitter path is connected across the supply in series with the operating coil of a relay A/3.

Thus when capacitor 46 discharges, relay A/3 operates. The relay has three contact sets, of which A1 is a changeover contact arranged when the relay is released to establish a discharge path for a capacitor 52 by way of a resistor 53 and when the relay is operated to connect capacitor 52 in shunt with the collector-emitter path of transistor 51. Thus even though transistor 51 is turned on by the applied pulse for a brief time only sufficient to cause relay A/3 to operate the relay will remain operated until the flow of current through its operating coil into capacitor 52 falls to a value insufficient to hold the relay operated. A diode 54, reversely and synchronously closed. Conutact A2 connects an 51 against voltage impulses resulting when contact A1 releases. Alternatively, actuation of the control circuit may be arranged to be initiated manually or on the occurrence of an external event. Manual actuation of the control circuit may be produced when desired by closing a push-button switch 55 which connects the relay operating coil across the supply in series with a current-limiting resistor 56. If it is required to operate the control circuit in the intervals of a rhythmically occurring signal, then the output of the operational amplifier 16 may, as indicated by conductor 61 shown in broken line, be connected to a conventionally designed threshold switch 62. Switch 62 may be coupled with relay A/3 by a conductor 63 shown in broken line. The operation of switch 62 may be such that either the arrival of a signal from amplifier 16 prevents the passage of a pulse from unijunction transistor 49 from actuating the relay, or that the relay is operated directly by the termination of a signal applied from amplifier 16 to switch 62.

Thus contacts A2 and A3 of relay A/3 are periodically and synchronously closed. Contact A2 connects an alternating current supply, derived from a winding 57 on transformer 35, to a solenoid actuator 58 which, through suitable mechanical linkages indicated only by broken lines 59 operates two valves 60, 64. Valve 60 now closes conduit 4 through which one side of spirometric head 1 is connected to measuring chamber 5, while valve 61 opens a bypass conduit to equalize the pressures in the two sides of the measuring chamber. A condition is thus established in which pressure measurement should yield a zero result.

To eliminate any drift in the measuring apparatus, contact A3 closes the feedback path which operates to apply any necessary correction to the input of measuring amplifier 16.

Alternatively, transducer 5 may be replaced by a simple transducer 5' having a single fluid pressure applied to an input connection thereof by way of a conduit 3' and wherein valves 65', 64' are respectively and simultaneously operable to disconnect the input connection from the conduit and to connect it to a reference pressure such as the ambient atmosphere.

It will be appreciated that if the differential manometer of the specific embodiment be replaced by a simple manometer, then one of the solenoid-operated valves will be arranged to disconnect the manometer from the measured pressure and the other to open the manometer to atmospheric pressure, thus establishing a datum condition.

Although the above description describes individual valves performing the required isolating and pressure-equalizing functions it may in some cases be convenient to employ a single valve performing both functions. The construction of such a valve will be obvious to the expert. In the case of an apparatus for differential pressure measurement, such as that illustrated, an additional valve 62, which again may be a part of a single, complex valve, can be arranged to isolate the second side of the measuring chamber from the pressure conduit.

I claim:
1. In fluid pressure measuring apparatus comprising transducer means responsive to fluid pressure applied thereto by conduit means to develop an electrical signal related to said pressure and measuring circuit means responsive to said signal to provide an output signal representative of said applied pressure, the improvement which comprises:
   fluid valve means in said conduit means operable to establish a datum condition in said transducer means;
   feedback circuit means including normally open switch means and operable upon closure of said switch means to reduce zero error within said measuring circuit means;
   and actuator means operable to produce operation of said fluid valve means and of said switch means thereby simultaneously to establish said datum condition and said feedback path.

2. The improvement claimed in claim 1 wherein said transducer means is a differential pressure transducer having individual fluid pressures applied to respective first and second input connections thereof by way of respective conduit means and wherein said valve means is operable to close one of said conduit means and to interconnect said first and second transducer input connections.

3. The improvement claimed in claim 1 wherein said transducer is a simple pressure transducer having a single fluid pressure applied to an input connection thereof by way of a conduit and wherein said valve means is operable to disconnect said input connection from said conduit and to connect it to a reference pressure, such as the ambient atmosphere.

4. The improvement claimed in claim 1 wherein said feedback path includes signal storage means.

5. The improvement claimed in claim 4 wherein said signal storage means includes an amplifier having an input and an output, a capacitor, and a negative feedback path including said capacitor from the input to the output of said amplifier.

6. The improvement claimed in claim 1 wherein said measuring circuit means includes a differential amplifier, having two inputs and one output, and means for applying said transducer signal to one said amplifier input, wherein said feedback circuit is connected to the other said amplifier input.

7. The improvement claimed in claim 1 including a relay having first and second contacts and an operating element, circuit means producing periodic excitation of said operating element, wherein said valve means includes an electrically operable actuator means.

8. The improvement claimed in claim 1 wherein said actuator means comprises the combination of a relay having first and second contact means; current pulse generator means producing periodic operation of said relay; electrically energizable valve operating means; a current source; and circuit means including said first relay contact applying current from said source to energise said valve operating means, and wherein said second relay contact constitutes said switch means.

9. The improvement claimed in claim 7 wherein said actuator means also includes threshold switch means responsive to said measuring circuit output signal exceeding a predetermined threshold level to prevent operation of said relay.

10. The improvement claimed in claim 7 wherein said actuator means also includes threshold switch means responsive to said measuring circuit output signal falling below a predetermined threshold level to produce energisation of said relay.

11. The improvement claimed in claim 7 wherein said actuator means also includes switch means manually operable to produce energisation of said relay.

References Cited

UNITED STATES PATENTS 3,397,581   8/1968   Bush _____ 73—398 X

S. CLEMENT SWISHER, Primary Examiner

J. W. ROSKOS, Assistant Examiner